United States Patent [19]

Elliott

[11] 4,206,950
[45] Jun. 10, 1980

[54] ANTI-SKID AND ANTI-SPIN BRAKE SYSTEM

[75] Inventor: Delbert R. Elliott, South Bend, Ind.

[73] Assignee: The Bendix Corporation, Southfield, Mich.

[21] Appl. No.: 897,240

[22] Filed: Apr. 17, 1978

[51] Int. Cl.² ............................................. B60T 8/02
[52] U.S. Cl. .................................... 303/110; 303/119
[58] Field of Search ............... 303/119, 115, 110, 106, 303/118

[56] References Cited

U.S. PATENT DOCUMENTS

| | | | |
|---|---|---|---|
| 3,532,391 | 10/1970 | Klein | 303/119 |
| 3,582,152 | 6/1971 | Burckhardt | 303/110 |

*Primary Examiner*—Reinhard J. Eisenzopf
*Attorney, Agent, or Firm*—Paul David Schoenle; Ken C. Decker

[57] ABSTRACT

A brake system for a vehicle having at least one wheel assembly comprises a master cylinder which is operable by an operator to communicate pressurized fluid to a wheel cylinder on the wheel assembly, thereby braking a rotatable member of the wheel assembly. The brake system also includes a pressure storage member and a pump which communicates pressurized fluid thereto. If a skidding condition is imminent, a control unit cooperates with a modulator valve to reduce the pressure communicated to the wheel cylinder, and when skidding is no longer imminent, the control unit cooperates with the modulator valve to communicate the pressure storage member to the wheel cylinder to reapply braking. If a spinning condition is evident, the control unit cooperates with the modulator valve to communicate the pressure storage member with the wheel cylinder of the wheel assembly thereby retarding rotation of the spinning rotatable member. In particular, a reservoir supplies fluid to the pump and the master cylinder, and the wheel cylinder is vented to the reservoir by the modulator valve upon an imminent skidding condition or at the termination of a spinning condition.

4 Claims, 1 Drawing Figure

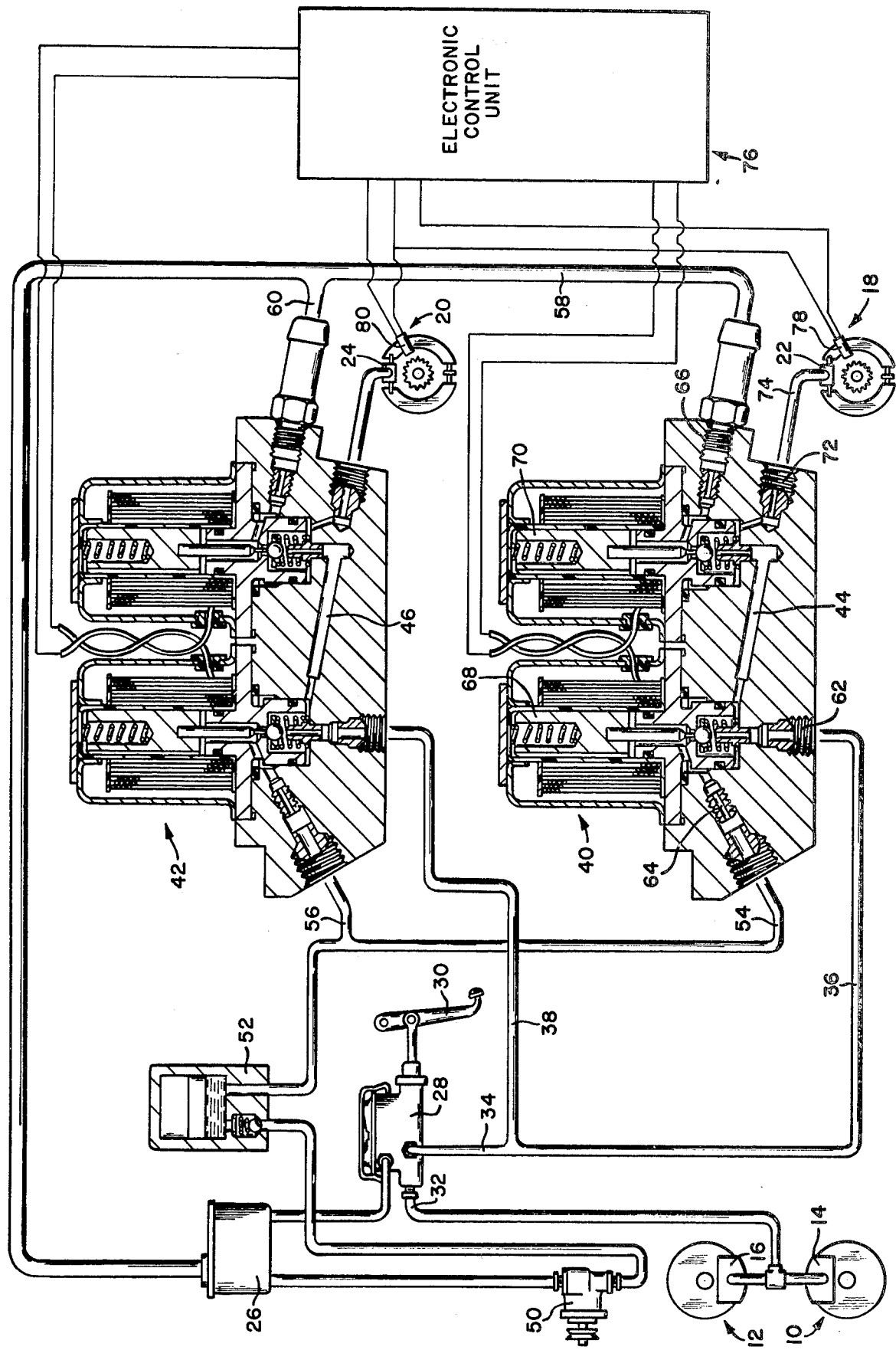

ANTI-SKID AND ANTI-SPIN BRAKE SYSTEM

BACKGROUND OF THE INVENTION

In a brake assembly it is known that a skidding condition for a wheel assembly can be compensated for by relieving the brake pressure communicated to the wheel assembly which is skidding. Moreover, a spinning condition for a wheel assembly of a pair of wheel assemblies can be substantially overcome by braking the spinning wheel assembly so that driving torque will be transmitted to another non-spinning wheel assembly. The electrical circuitry for detecting skidding and/or spinning of a wheel assembly is well known in the prior art as evidenced by U.S. Pat. Nos. 3,482,887 and 3,811,526.

Generally, the electrical circuitry is integrated with a braking system to control communication of pressurized fluid to the wheel assembly. Although, many types of braking systems are feasible for integration with an anti-skidding and anti-spinning electrical circuit, it is believed that a simple brake system which is easily adapted for use with such an electrical circuit is an advance in the state of the art.

SUMMARY OF THE INVENTION

The present invention provides a braking system which is adapted for integration with an anti-skidding and anti-spinning circuit. The brake system comprises a fluid pressure generating means, a modulator valve, a fluid pressure source, and a fluid pressure storage chamber. During normal braking the fluid pressure generating means communicates pressurized fluid to a wheel assembly via the modulator valve.

When a skidding condition is imminent, a control unit senses the change in rotation of the wheel assembly and actuates the modulator valve to close communication between the fluid pressure generating means and the wheel assembly while also venting the wheel assembly to a reservoir of the fluid pressure generating means, thereby relieving the brake pressure communicated to the wheel assembly. Consequently, the wheel assembly speeds up to stimulate the control unit to deactivate the modulator valve, so that normal braking can continue until such time that skidding is imminent again. When the modulator valve is actuated, pressurized fluid from the fluid pressure storage member is communicated to the modulator valve so that upon termination of the skidding condition and reapplication of braking, pressurized fluid from the fluid pressure storage chamber is initially communicated to the wheel assembly before communication between the latter and the fluid pressure generating means is established.

During spinning, one wheel assembly is generally rotating at a faster speed than another wheel assembly. At such time the control unit responds to actuate the modulator valve to open communication between the fluid pressure storage member and the spinning wheel assembly, and to simultaneously close communication to the latter from the pressure generating means. Therefore, the spinning wheel assembly is braked by the pressurized fluid from the storage chamber so that the driving torque causing the wheel assembly to spin is transmitted to another driven wheel assembly. When the spinning wheel assembly speed is reduced to substantially equal that of the other wheel assembly the control unit operates to deactivate the modulator valve thereby closing the communication from the fluid pressure storage member to the wheel assembly which was spinning, while also venting the wheel assembly to a reservoir.

In a hydraulic brake system the fluid pressure generating means comprises a master cylinder communicating with the reservoir, mentioned beforehand, and an operator actuator cooperating with the master cylinder to selectively communicate pressurized fluid to the modulator valve upon demand of a vehicle operator. The pressure source comprises an engine driven pump or suitable electric motor driven pump in communication with the reservoir and communicating pressurized fluid from the reservoir to the fluid pressure storage member, which comprises an accumulator.

It is an object of the present invention to use a single reservoir for the purpose of communicating fluid from the reservoir to a wheel assembly during normal braking, to a pump and then to a fluid pressure storage member for communication to the modulator valve and the wheel assembly during spinning or reapplication of braking subsequent to the elimination of a skidding condition. Moreover, the reservoir communicates with the modulator valve to receive pressurized fluid from the wheel assembly when the wheel assembly is vented during skidding and after spinning is eliminated.

BRIEF DESCRIPTION OF THE DRAWING

The sole FIGURE shows a schematic illustration of a brake assembly made according to the present invention and adapted for integration with an anti-skidding and anti-spinning electrical unit.

DETAILED DESCRIPTION

In the brake system illustrated in the sole FIGURE, a pair of non-driven wheel assemblies 10 and 12 include suitable brake mechanisms 14 and 16, such as drum or disc brakes. Similarly, a pair of driven wheel assemblies 18 and 20 include brake mechanisms 22 and 24, such as drum or disc brakes.

A reservoir 26 is filled with a fluid and is in communication with a master cylinder 28 which operates in response to movement of the brake pedal 30 to communicate pressurized fluid from the reservoir 26 to each wheel assembly via conduits 32 and 34. The conduit 34 communicates with the driven wheel assemblies 18 and 20 by way of respective passages 36 and 38 and modulator valves 40 and 42. In a normal braking mode the modulator valves 40 and 42 permit fluid to communicate via intermediate passages 44 and 46 from the passages 36 and 38 to the wheel assemblies 18 and 20.

In accordance with the invention a pressure source or pump 50 communicates with the reservoir 26 and a fluid pressure storage member 52 in order to charge the latter with pressurized fluid from the reservoir 26. The pressure source 50 can comprise an engine driven pump, an electric motor driven pump or other suitable pump mechanisms on a vehicle. The pressure storage member 52 communicates via passages 54 and 56 with respective modulator valves 40 and 42. Moreover, return passages 58 and 60 communicate the respective modulator valves 40 and 42 with the reservoir 26.

Preferably, the modulator valves 40 and 42 are identical so that a description of one is equally applicable to the other. The modulator valve 40 includes an inlet 62 communicating with the passage 36, a secondary port 64 communicating with the passage 54 and an outlet 66 communicating with the return passage 58. The modulator valve 40 also comprises a pair of solenoid valves 68 and 70, the solenoid valve 68 normally closing the passage 54 to the intermediate passage 44 and opening the latter to the passage 36 and the solenoid valve 70 normally closing the return passage 58 to the intermediate passage 44. As shown in the FIGURE, an outlet 72 on the modulator valve 40 communicates with the wheel assembly 18 via passage 74 and the solenoid valve 70 normally opens communication between the intermediate passage 44 and the outlet 72.

An electronic control unit 76 monitors the speed of rotation of the wheel assemblies 18 and 20 via wheel speed sensors 78 and 80 and is connected to the modulator valves 40 and 42 to control the operation of the solenoid valves therein.

MODE OF OPERATION

During a normal braking application, the brake pedal 30 is moved by a vehicle operator to communicate pressurized fluid from the master cylinder 28 to the non-driven wheel assemblies 10 and 12 via passage 32, to the driven wheel assembly 18 via passages 34 and 36, inlet 62, intermediate passage 44, outlet 72 and passage 74, and to the driven wheel assembly 20 via passages 34 and 38 and modulator valve 42 in the same manner as modulator valve 40. Consequently, the rotation of a rotatable member associated with each wheel assembly 10, 12, 18, and 20 is reduced.

If, during braking, one or both of the driven wheel assemblies begins to manifest an imminent skidding condition so that a rotatable member rotates at a speed which is decelerating faster than a desired rate, the control unit responds to the imminent skidding condition to activate either modulator valve 40 or modulator valve 42. For example, if modulator valve 40 is activated, the solenoid valve 68 is moved to close the passage 36 from the intermediate passage 44 and open the latter to the passage 54 and the solenoid valve 70 is moved to close the intermediate passage 44 from the passage 74 and open the latter to the return passage 58. Consequently, the imminent skidding condition of a rotatable member associated with wheel assembly 18 causes the control unit 76 to activate the modulator valve 40, which in turn, closes the master cylinder from the passage 44 while opening the braking mechanism 22 to the return passage 58 to vent the mechanism 22 to the reservoir 26, thereby reducing the pressurized fluid communicated to the wheel assembly 18 to compensate for the skidding condition. In addition, the modulator valve 40 opens the passage 44 to the fluid pressure storage member 52 so that upon termination of the skidding condition the solenoid valve 70 returns to its normal position closing passage 58 in order to reapply the brake mechanism 22 by the pressurized fluid from the fluid pressure storage chamber 52. A time delay in the control unit 76 returns the modulator valve 68 to its normal position after the solenoid valve 70 is returned whereupon braking of the wheel assembly 18 continues in response to the actuation of the master cylinder 28 and the fluid pressure storage chamber is closed from the intermediate passage 44.

In general, a motorized vehicle is provided with a differential to transmit rotation to that wheel assembly which offers the least resistance. For example, if one of the driven wheels 18 or 20 is positioned on an icy or slippery surface, the differential will transmit torque to that wheel assembly as a dry surface offers more resistance to the rotation of the rotatable member associated with the wheel assembly on the dry surface. With the present invention a spinning condition for one of the wheel assemblies actuates the control unit to compensate for the spinning condition. For example, if the wheel assembly 18 is rotating at a faster rate than wheel assembly 20, the control unit senses this difference via wheel speed sensors 78 and 80 and reacts to activate the solenoid valve 68 of modulator valve 40. With only the solenoid valve 68 actuated, pressurized fluid stored in the fluid pressure storage member 52 is communicated via passage 54, secondary port 64, actuated solenoid valve 68, passage 44, open solenoid valve 70, outlet 72, and passage 74, to the spinning wheel assembly 18. The increase in pressurized fluid at the spinning wheel assembly 18 effectuates a braking application of the wheel assembly, thereby increasing the resistance to rotation so that the differential (not shown) tranfers torque from the wheel assembly 18 to the wheel assembly 20. Consequently, driving torque is transmitted to the non-spinning wheel assembly which is capable of delivering more traction to the vehicle. When the spinning condition of either wheel assembly is terminated, the control unit senses the equal rotation of each wheel assembly to deactuate the one solenoid valve 68 of the modulator valve 40. Therefore, the modulator valve is returned to its normal position. Alternatively, prior to deactivation of solenoid valve 68, it may be desirable to activate solenoid valve 70 to decrease brake pressure in braking mechanism 22 by communicating passage 74 to passage 58, thus reducing the rotational retarding force on wheel assembly 18.

Although the wheel speed sensors 78 and 80 are attached to the driven wheel assemblies 18 and 20 it is within the scope of the present invention to attach wheel speed sensors to the non-driven wheel assemblies 10 and 12 for the purpose of monitoring skidding. Moreover, the fluid utilized in the brake system can be a liquid or a gas. If the gas is air, the atmosphere may become the reservoir 26, and the master cylinder 28, may become a suitable valve assembly communicating with the pressure storage chamber 52, and passages 32 and 34.

A fluid pressure generating means comprising the master cylinder 28 is operable to communicate pressurized fluid to the vehicle wheel assemblies during braking. The pressure source 50 is operable continuously, or selectively in response to feed back (not shown) from the fluid pressure storage member to charge the latter with pressurized fluid and the storage member operates in conjunction with the modulator valve 40 or 42 to momentarily effectuate braking of a wheel assembly after a skidding condition is relieved and to effectuate braking of a wheel assembly during spinning of the wheel assembly. Consequently, a common fluid from the reservoir 26 is used to control braking, skidding and spinning of a wheel assembly.

Although the foregoing description proceeds with reference to the sole FIGURE, there are many variations and/or modifications which are feasible to one skilled in the art and, as such, are included within the scope of the appended claims.

I claim:

1. A brake system for a vehicle having at least one wheel assembly comprising:
   a fluid pressure generating means normally communicating with the wheel assembly during braking;
   a modulator valve normally communicating said fluid pressure generating means with the wheel assembly during braking;

a fluid pressure storage member communicating with said modulator valve; and a control unit sensing the speed of rotation of the wheel assembly and comparing the same with a variable reference speed, said control unit cooperating with said modulator valve to close communication between said fluid pressure generating means and the wheel assembly when the speed of rotation of the wheel assembly is less than the variable reference speed to substantially reduce fluid pressure within the wheel assembly and cooperating with the modulator valve to open communication between said fluid pressure storage member and the wheel assembly when the speed of rotation of the wheel assembly is greater than the variable reference speed to substantially increase fluid pressure within the wheel assembly.

2. The brake system of claim 1 in which said control unit cooperates with said modulator valve to communicate said wheel assembly with a reservoir independently of the communication between the fluid pressure generating means and the wheel assembly when the communication of the fluid pressure storage member with the wheel assembly reduces the speed of rotation of the wheel assembly to substantially equal the variable reference speed.

3. In a brake system comprising a fluid pressure generating means, a wheel assembly having a rotatable member to be braked, a modulator valve communicating the fluid pressure generating means with the wheel assembly and a control unit responsive to the speed of rotation of the rotatable member to urge the modulator valve to normally communicate the fluid pressure generating means with the wheel assembly and to close communication between the fluid pressure generating means and the wheel assembly when the speed of rotation of the rotatable member is below a first predetermined value, the brake system being characterized by a fluid pressure storage member disposed in communication with the modulator valve, the control unit cooperating with the modulator valve to open communication between said fluid pressure storage member and the wheel assembly to brake the rotatable member in response to fluid pressure within the storage member when the speed of rotation of the latter is above a second predetermined value, and the control unit cooperating with the modulator valve to vent the wheel assembly when the speed of rotation of the latter is below the first predetermined value and the control unit cooperating with the modulator valve to charge the modulator valve with fluid pressure from the fluid pressure storage member when the wheel assembly is vented.

4. The brake system of claim 3 characterized by the modulator valve comprising a pair of solenoid valves, the control unit actuating the pair of solenoid valves during braking of the rotatable member when the latter is rotating below the first predetermined value to close communication between the fluid pressure generating means and the wheel assembly and vent the wheel assembly, and the control unit actuating one of the pair of solenoid valves during non-braking when the rotatable member is rotating above the second predetermined value to communicate fluid pressure from said fluid pressure storage member to the wheel assembly.

* * * * *